June 3, 1969     A. G. HAYDU ET AL     3,447,640
FLUID PRESSURE OPERATED BRAKE APPARATUS FOR RAILWAY CAR TRUCK
Filed April 7, 1967

INVENTOR.
ANDREW G. HAYDU
EARL E. ALLAN
BY
ATTORNEY

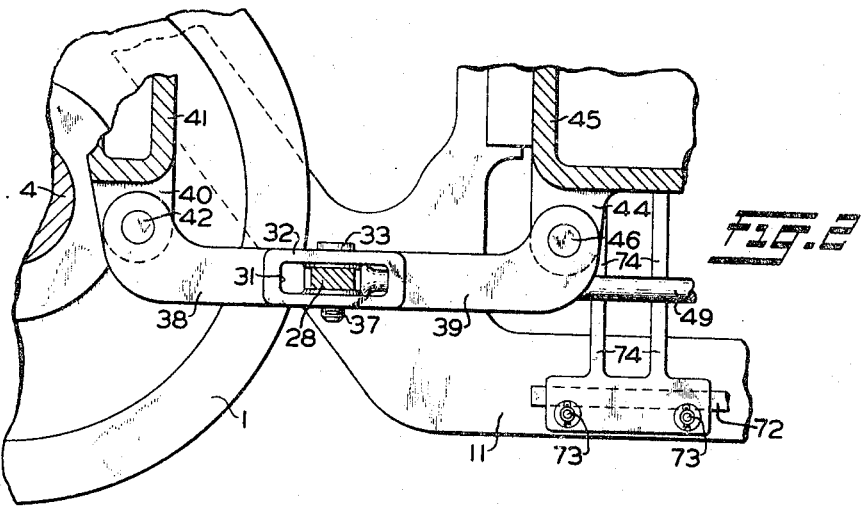

United States Patent Office 3,447,640
Patented June 3, 1969

3,447,640
FLUID PRESSURE OPERATED BRAKE APPARATUS FOR RAILWAY CAR TRUCK
Andrew G. Haydu, Pittsburgh, and Earl E. Allan, Monroe Heights, Pa., assignors to Westinghouse Air Brake Company, Wilmerding, Pa., a corporation of Pennsylvania
Filed Apr. 7, 1967, Ser. No. 629,250
Int. Cl. B61h 13/00; B60t 11/10; F16d 65/14
U.S. Cl. 188—47                      10 Claims

ABSTRACT OF THE DISCLOSURE

The present invention comprises a brake rigging for a three-axle six-wheel railway car truck wherein one brake cylinder device is secured to one of two brake beams and operatively moves both of these two brake beams to apply the brakes to the four wheels on two axles of the truck through a linkage including a force equalizing lever pivotally mounted on the other of the two brake beams, and a second brake cylinder device of the same size as the said one brake cylinder device is secured to a third brake beam and operatively moves this third brake beam to simultaneously apply the brakes on the two wheels of the third axle of the truck through a linkage including a second force equalizing lever pivotally carried by the bolster of the car truck, the resultant braking forces on all three brake beams being the same for equivalent operating fluid pressures supplied to the two brake cylinders.

Figure 1:
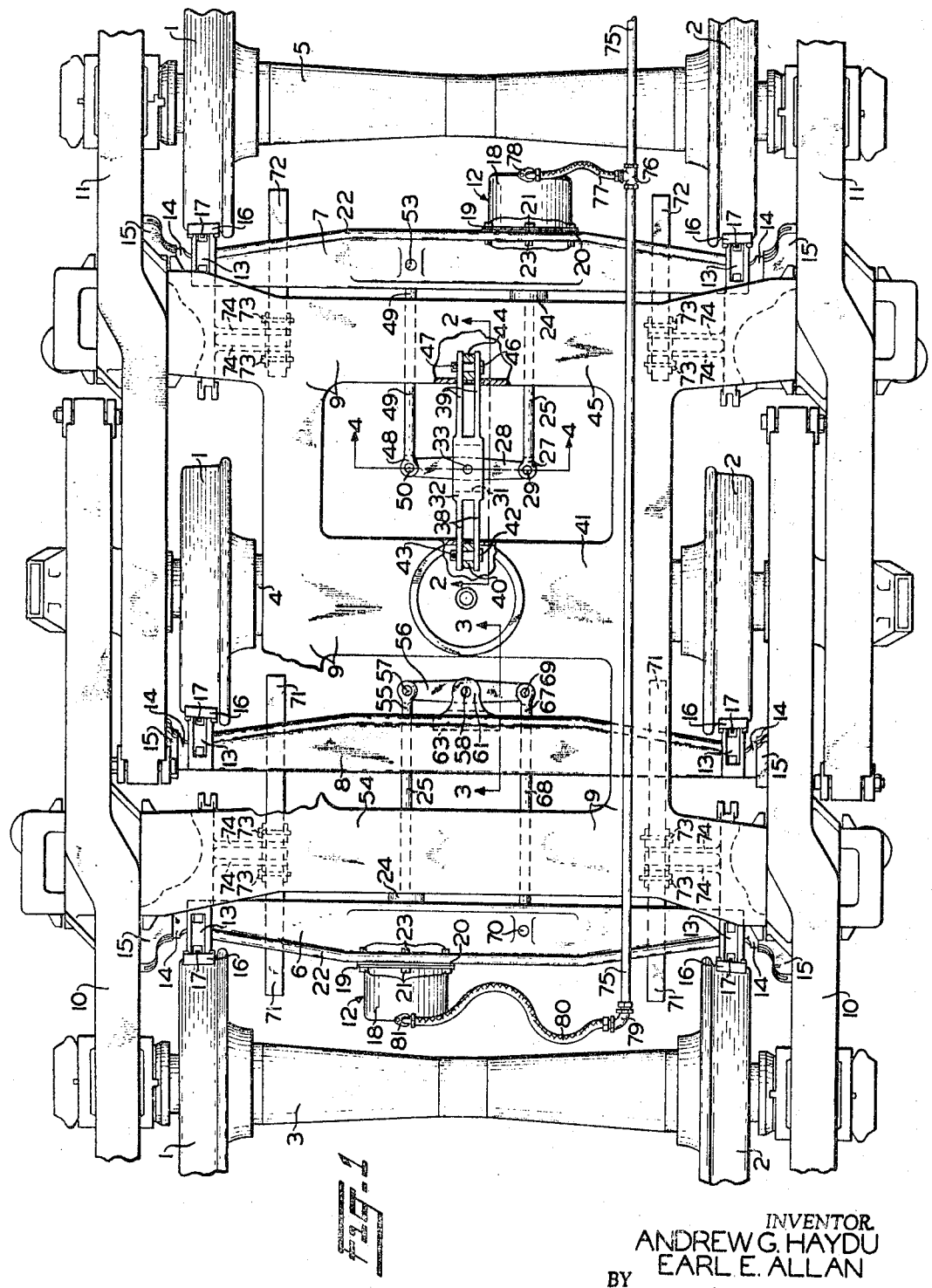

In recent years a variety of designs of brake rigging have been devised for railway rolling stock. One of the present day brake riggings for four-wheel railway car trucks consists of two parallel brake beams each carrying a brake cylinder device with a piston that is operatively connected to the other brake beam by a piston rod so that the brake beams are moved in opposite directions respectively by the fluid pressure forces acting in opposite directions on the bodies of the brake cylinder devices and the respective pistons of these cylinder devices. Such a brake rigging is shown in patent 2,958,398 issued Nov. 1, 1960, to George K. Newell and assigned to the assignee of the present application.

The present day trend in railway car construction is toward longer cars which necessarily results in greater overall weight of the car and consequently a corresponding increase in the weight to be supported by each railway car truck. This increase in the weight to be supported by each truck requires the use of a three-axle six-wheel type of railway car truck since the two-axle four-wheel type of truck is not suitable for supporting the heavier cars now being built and used on American railroads.

It is the general purpose of this invention to provide a novel brake assembly for a three-axle six-wheel railway car truck utilizing a simple and relatively low cost arrangement involving a brake beam associated with each of the three wheel pairs, the three beams being actuable appropriately to cause brake shoes carried by each brake beam to effect a braking action on a corresponding pair of wheels of the car truck in response to the concurrent supply of fluid under pressure to two brake cylinders carried on certain of the brake beams.

More particularly, according to the present invention, this novel brake assembly includes two brake beams arranged parallel and adjacent to two axle-connected wheel pairs of a three-axle six-wheel car truck, one of the two brake beams carrying a brake cylinder device having a piston and piston rod operatively connected to one end of a force equalizing lever that is pivotally mounted on the other of the two brake beams, the other end of the lever being operatively connected by a link to the one brake beam. The assembly also includes a third brake beam arranged parallel and adjacent to the third remaining axle-connected wheel pair of the truck, which carries a brake cylinder device corresponding in size to the first mentioned brake cylinder device. The piston rod of the latter brake cylinder device is operatively connected to one end of a force equalizing lever that is pivotally mounted on a supporting bracket carried by the car bolster while the other end of the force equalizing lever is operatively connected by a link to the third brake beam. A common conduit connects the two brake cylinder devices to provide for the concurrent supply of fluid under pressure to and the release of fluid under pressure from the two brake cylinder devices to effect movement of the corresponding brake beams to effect application and release of the brake shoes carried by the three brake beams with respect to the corresponding six wheels of the car truck.

In the accompanying drawings:
FIG. 1 is a plan view of a three-axle six-wheel car truck with a portion of the truck bolster broken away, showing the structure of the novel brake assembly.
FIG. 2 is a vertical cross-sectional view, on an enlarged scale, taken along the line 2—2 of FIG. 1 and looking in the direction of the arrows showing details of the manner by which one of the force equalizing levers is pivotally carried by the bolster of the car truck.
FIG. 3 is a vertical cross-sectional view, on an enlarged scale, taken along the line 3—3 of FIG. 1 and looking in the direction of the arrows, showing details of the manner by which the other force equalizing lever is pivotally carried by one of the brake-cylinder-carrying brake beams.
FIG. 4 is a vertical cross-sectional view, on an enlarged scale, taken along the line 4—4 of FIG. 1 and looking in the direction of the arrows, showing further structural mounting details of the force equalizing lever shown in FIG. 2.

Referring to FIG. 1 of the drawings, the reference numerals 1 and 2 designate respectively the wheels secured at opposite ends of each of three axles 3, 4, and 5 of a three-axle six-wheel railway car truck.

The brake rigging shown in the drawings comprises two cast brake-cylinder-carrying brake beams 6 and 7 and a non-brake-cylinder-carrying brake beam 8 which three brake beams extend crosswise of the car truck and in parallel spaced relation to each other and to a truck bolster 9. The brake beams 6, 7 and 8 are arranged parallel to the transverse arms of truck bolster 9 and are movably supported at each end on one of two side frame members 10 and 11 on each side of the truck in the usual way as hereafter described.

Each of the brake beams 6 and 7 is constructed to provide a support for a single brake cylinder device 12, and the brake beam 8 may be in the form of a cast structural channel member the web of which is provided with a pair of properly spaced-apart bores through which extend certain links of a hereinafter-described linkage.

A brake head 13 is cast integral with each end of each of the three cast brake beams 6, 7 and 8 adjacent to and on the inboard side of a guide foot 14 which also may be cast integral with the respective brake beam. Each guide foot 14 is a flat L-shaped metal member having a leg that is slidably supported in a grooved wear plate and guide member 15 secured to the corresponding one of the truck side frame members 10 and 11. The wear plate and guide members 15 and guide feet 14 serve to support the brake beams 6, 7 and 8 at the proper height above the rails (that is somewhat below the horizontal diameter of the wheel) the groove in the wear plate and guide members being at a slight angle to the horizontal to permit bodily movement of the brake beams in a direction substantially radially of the associated wheels when a brake application is made.

Each of the brake heads 13 carries a composition brake shoe 16 for contact with the tread of an associated wheel. In customary manner each shoe has a backing plate provided with a key bridge to receive the usual brake shoe key 17 for removably locking the shoe to the brake head.

The brake shoes 16 are operated into and out of contact with their associated wheel 1, 2 by means of the brake cylinder devices 12 which are secured to the brake beams 6 and 7 in a manner now to be described.

In order to secure a brake cylinder device 12 to the brake beams 6 and 7, the web of a somewhat bowed cast C-beam or channel member constituting the brake beams 6 and 7 has formed therewith at one side of a point midway the length thereof a circular opening (not shown). The respective opposite ends of this opening are provided with inturned flanges (not shown) which form circular openings one of which is substantially the same diameter as the outside diameter of a cup-shaped body 18 of the brake cylinder device 12 which body is provided intermediate its ends with an out-turned flange 19 (FIG. 1) between which and an in-turned flange integral with the respective brake beam is disposed a gasket 20 constructed of any suitable resilient material. The out-turned flange 19 and the gasket 20 are provided with a plurality of arcuately spaced smooth bores (not shown) through which extends a plurality of bolts 21 that also extend through smooth bores (not shown) provided in an out-turned flange 22 integral with the upper and lower horizontal flanges of the brake beams 6 and 7, only the upper flange 22 being shown in FIG. 1. The ends of the bolts 21 receive nuts 23 which when tightened serve to secure each body 18 to the respective brake beam.

The other in-turned flange integral with the brake beams 6 and 7 constitutes a non-pressure head (not shown) of the brake cylinder device 12. This non-pressure head has therein a bore (not shown) through which a hollow rod 24 extends, the left-hand end (not shown) of which is integral with a piston (not shown) slidably mounted in the cup-shaped body 18 of the respective brake cylinder device 12. Each hollow rod 24 is adapted to receive therein a push rod 25.

The right-hand push rod 25 shown in FIG. 1 extends through a window 26 (FIG. 4) formed in the brake beam 7. The left-hand end, as viewed in FIG. 1, of this push rod 25 has formed thereon a clevis 27 the jaws of which are disposed on the opposite sides of one end of a force equalizing lever 28 which is pivotally connected to the clevis 27 by any suitable means, such as, for example, a headed pin 29 and a cotter pin 30 (FIG. 4).

The lever 28 extends through an opening 31 formed in a supporting bracket 32. As shown in FIG. 4, the lever 28 substantially midway its ends is rockably mounted on the bracket 32 by means such as, for example, a headed pin 33 that extends through coaxial bores 34 and 35 (FIG. 4) provided in the bracket 32 and a bore 36 in the lever 28, and carries at its lower end, as viewed in FIG. 4, a cotter pin 37.

As best shown in FIG. 1, the supporting bracket 32 has formed integral therewith and on opposite sides of the opening 31 therein a pair of clevises 38 and 39. As shown in FIGS. 1 and 2 of the drawings, the jaws of the clevis 38 are disposed on the opposite sides of a lug 40 that is formed integral with and on the lower side of the center transverse member or transom 41 of the truck bolster 9 and connect thereto by any suitable means such as, for example, a headed pin 42 and a cotter pin 43. Likewise, the jaws of the clevis 39 are disposed on the opposite sides of a lug 44 that is formed integral with and on the lower side of the right-hand transverse member or transom 45 of the truck bolster 9 and connected thereto by any suitable means such as, for example, a headed pin 46 and a cotter pin 47.

As shown in FIGS. 1 and 4 of the drawings, the other end of the above-mentioned lever 28 is disposed between the jaws of a clevis 48 formed on the left-hand end, as viewed in FIG. 1, of a link 49 and pivotally connected thereto by any suitable means, such as, for example, a headed pin 50 and a cotter pin 51 (FIG. 4).

As shown in FIG. 1, the link 49 occupies a position in spaced parallel relation to the push rod 25 and extends through a second window 52 (FIG. 4) formed in the brake beam 7. The right-hand end of the link 49, as viewed in FIG. 1, is operatively connected to the brake beam 7 by means such as, for example, a headed pin 53 and a cotter pin (not shown).

The left-hand push rod 25 shown in FIG. 1 extends through a window (not shown) formed in the brake beam 8. The right-hand end, as viewed, in FIG. 1, of the left-hand push rod 25 has formed thereon a clevis 55 the jaws of which are disposed on the opposite sides of one end of a force equalizing lever 56 which is pivotally connected to the clevis 55 by any suitable means such as, for example, a headed pin 57 and a cotter pin (not shown). The lever 56 is rockably mounted on a headed pin 58 that extends through coaxial bores (not shown) in a pair of jaws 59 and 60 (FIG. 3) of a clevis 61 (FIG. 1) and a coaxial bore (not shown) provided in the lever midway the ends thereof. The lower end of the headed pin 58 carries a cotter pin 62 (FIG. 3) to prevent removal of the pin 58 by the vibration occurring while the car truck is traveling at a high speed along a railway track.

As best shown in FIG. 3, the jaws 59 and 60 of the clevis 61 are formed integral with and extend outward from a substantially rectangular member 63 which is disposed between the upper and lower horizontal flanges 64 and 65 (FIG. 3) of the brake beam 8 substantially midway the ends thereof and welded to these flanges as indicated by the numerals 66 in FIG. 3.

The other end of the above-mentioned lever 56 (FIG. 1) is disposed between the jaws of a clevis 67 formed on the right-hand end, as viewed in FIG. 1, of a link 68 and pivotally connected thereto by means, such as, for example, a headed pin 69 and a cotter pin (not shown).

As shown in FIG. 1, the link 68 occupies a position in spaced-apart substantially parallel relation to the left-hand push rod 25 and extends through a window (not shown) in the brake beam 8 and a coaxial window (not shown) in the brake beam 6. The left-hand end of the link 68, as viewed in FIG. 1, is operatively connected to the brake beam 6 as by means such as, for example, a headed pin 70 and a cotter pin (not shown).

In order to prevent either of the brake beams 6 and 8 from falling to the railway road bed should one or both of the guide feet 14 cast integral with the respective brake beam become detached therefrom, or should a guide member 15 become detached from its corresponding side frame, a pair of identical spaced-apart parallel safety supporting straps 71 are provided which are in the form of an elongated bar rectangular in cross-section and of more than sufficient length to extend beneath both of the brake beams 6 and 8. Likewise, for the same purpose, a pair of identical spaced-apart parallel safety supporting straps 72 extend beneath the brake beam 7. Each of the safety supporting straps 71 and 72 is disposed between the bight of a clevis and a pair of spaced apart headed pins 73 that extend through coaxial bores (not shown) formed in the opposite jaws of the respective clevis which is formed at one end of and integral with a pair of spaced-apart parallel downwardly extending arms 74 (FIG. 1) the opposite ends of which are integral with the respective transom of the truck bolster 9.

In order to provide for the concurrent supply of fluid under pressure to and the release of fluid under pressure from a pressure chamber (not shown) in each of the two brake cylinder devices 12 carried by the respective brake beams 6 and 7, the right-hand end of a pipe or conduit 75 is connected to the brake cylinder passageway in the usual brake control valve device (not shown) of the air brake system on railway freight cars. A pipe T 76 disposed in the pipe 75 has its side outlet connected to one end of a flexible hose 77 the opposite end of which is connected to a flanged type elbow fitting 78 secured to the brake cylinder device 12 carried by the brake beam 7 it being understood that one end of a passageway (not shown) formed in the elbow fitting 78 registers with one end of a corresponding passageway formed in the body 18 of this brake cylinder device the opposite end of which corresponding passageway opens into the hereinbefore-mentioned pressure chamber in this brake cylinder device 12.

An elbow fitting 79 is connected to the left-hand end of the pipe 75. One end of a flexible hose 80 is secured to the elbow fitting 79 and the opposite end of this hose 80 is conencted to a flange type elbow fitting 81 secured to the brake cylinder device 12 carried by the brake beam 6 it being understood that a passageway (not shown) in this fititng 81 is in communication with the pressure chamber in this brake cylinder device 12 in the manner described above for the brake cylinder device 12 carried by the brake beam 7.

In operation, when it is desired to effect a brake application, fluid under pressure is admitted to the pipe 75 by operation of the brake control valve device of the usual air brake system on railway cars under the control of the operator. Fluid under pressure thus supplied to the pipe 75 flows therefrom to the pressure chamber in the brake cylinder device 12 carried by the brake beam 7 via the side outlet of the pipe T 76, flexible hose 77 and elbow fitting 78.

Simultaneously as fluid under pressure is supplied to the pressure chamber in the brake cylinder device 12 carried by the brake beam 7, fluid under pressure is supplied from the pipe 75 to the pressure chamber in the brake cylinder device 12 carried by the brake beam 6 via the elbow fitting 79, hose 80 and elbow fitting 81. Consequently, the fluid under pressure supplied simultaneously to the pressure chambers in the two brake cylinder devices 12 is effective, respectively, to move the piston and the body 18 of the brake cylinder device 12 carried by the brake beam 6 in opposite direcitons, and the piston and the body 18 of the brake cylinder device 12 carried by the brake beam 7 in opposite directions.

Fluid under pressure thus supplied to the chamber in the brake cylinder device 12 carried by the brake beam 6 is effective to move the piston therein and the brake cylinder body 18 in opposite directions. As the piston and the body 18 are moved in opposite directions, the body 18 transmits a force to the brake beam 6 which acts in the direction of the left hand, as viewed in FIG. 1.

Simultaneously, the piston transmits a force to the lever 56 via the push rod 25, clevis 55 and pin 57 which force is effective to rock the lever 56 clockwise, as viewed in FIG. 1, about the pin 58 carried by the clevis 61, it being noted that the lever 65 is mounted on the pin 58 intermediate the ends of this lever.

The clockwise rocking of the lever 56 about the pin 58 is effective to transmit a force to the link 68 via the pin 69 and the clevis 67. Since the lever 56 is mounted on the pin 58 midway the ends thereof, it is apparent that the force transmitted to the link 68 by the lever 56 is equal in magnitude to the force transmitted to the lever 56 by the push rod 25. Furthermore, it is apparent from FIG. 1 of the drawings, that the force thus transmitted to the link 68 acts in a direction opposite the direction of the force transmitted to the push rod 25 by the piston of the brake cylinder device 12 carried by the brake beam 6. The force thus transmitted to the link 68 is in turn transmitted to the brake beam 6 via the pin 70.

As can be seen from FIG. 1, the location of the center line of the pin 70 is the same distance on one side of the point midway the ends of the brake beam 6 as is the location of the longitudinal center line of the brake cylinder device 12 on the other side of this point midway the ends of the brake beam 6. Accordingly, it is apparent that the brake beam 6 is acted upon by two equal forces acting in the same direction on opposite sides of the point midway the ends of this beam 6 and equal distances from this point. Therefore, it will be understood that these two equal forces acting on the brake beam 6 will move it in the direction of the left hand, as viewed in FIG. 1 of the drawings, until the brake shoes 16 carried by this beam 6 are brought into braking contact with the tread surface of the wheels 1 and 2 secured to the opposite ends of the axle 3. This movement of these brake shoes 16 carried by the brake beam 6 into braking contact with the tread surface of the wheels 1 and 2 carried by the axle 3 of the truck prevents further movement of the brake beam 6 in the direction of the left hand.

Subsequent to movement of the brake shoes 16 carried by the brake beam 6 into braking contact with the tread surfaces of the wheels 1 and 2 carried by the axle 3, the link 68 cannot move further in the direction of the left hand, as viewed in FIG. 1. Accordingly, it will be apparent that the pin 69 becomes a fixed fulcrum for the lever 56. Therefore, the force now transmitted to the lever 56 from the piston of the brake cylinder device 12 carried by the brake beam 6, via the push rod 25, clevis 55 and pin 57, becomes effective to rock this lever 56 clockwise, as viewed in FIG. 1, about the pin 69.

Since the lever 56 is pivotally mounted on the pin 58 midway the length of the lever 56, it is apparent that the force transmitted to the pin 58 by the lever 56 is twice the force transmitted to the pin 57 by the piston of the brake cylinder device 12 carried by the brake beam 6 via the push rod 25. Accordingly, it will be understood that the brake beam 8 will now be moved in the direction of the right hand, as viewed in FIG. 1, by a force transmitted thereto by the pin 58 via the clevis 61 and rectangular member 63, and that the magnitude of this force is equal to the sum of the two above-described forces acting on the brake beam 6 to move it in the direction of the left hand, as viewed in FIG. 1. Therefore, the brake beam 8 will be moved in the direction of the right hand until the brake shoes 16 carried by this brake beam are brought into braking contact with the tread surface of the wheels 1 and 2 carried at the opposite ends of the axle 4 of the truck which prevents further movement of the brake beam 8 in the direction of the right hand.

As the beams 6 and 8 are moved, as described above, these beams are supported and guided by the guide feet 14 as each of these feet has sliding contact in a corresponding groove in the respective wear plate and guide member 15 as hereinbefore-mentioned, the orientation of the wear plates and guide member 15 being such that the brake beams 6 and 8 and the brake shoes 16 carried thereby are moved substantially radially toward the corresponding wheels.

It will be understood that, in view of the symmetrical disposition of the brake beams 6 and 8 on opposite sides of the transom 54 of the truck bolster 9, and since the area of the piston and the cup-shaped end of the body 18 of the brake cylinder device 12 are the same, the fluid under pressure now being supplied to the chamber therebetween produces substantially equalized forces of application of all the brake shoes carried by the brake beams 6 and 8 on the wheels carried at opposite ends of the axles 3 and 4 of the car truck.

Fluid under pressure supplied from the pipe 75 to the chamber in the brake cylinder device 12 carried by the brake beam 7 in the manner described above is effective to move the piston in the body 18 of this brake cylinder device 12 and this body 18 in opposite directions. As this piston and body 18 are moved in opposite directions, the body 18 transmits a force to the brake beam 7 which force acts in the direction of the right hand, as viewed in FIG. 1.

Simultaneously, the piston of the brake cylinder device 12 carried by the brake beam 7 transmits a force to the lever 28 via the push rod 25, clevis 27 and pin 29 which force is effective to rock the lever 28 clockwise, as viewed in FIG. 1, about the pin 33 carried by the supporting bracket 32, it being noted that the lever 28 is mounted on the pin 33 midway the ends of this lever.

The clockwise rocking of the lever 28 about the pin 33 is effective to transmit a force to the link 49 via the pin 50 and the celvis 48. Since the lever 28 is mounted on the pin 33 midway the ends thereof, it is apparent that the force transmitted to the link 49 by the lever 28 is equal in magnitude to the force transmitted to the lever 28 by the push rod 25. Furthermore, it is apparent from FIG. 1 of the drawings, that the force thus transmitted to the link 49 acts in a direction opposite the direction of the force transmitted to the push rod 25 by the piston of the brake cylinder device 12 carried by the brake beam 7. The force thus transmitted to the link 49 is in turn transmitted to the brake beam 7 via the pin 53.

As can be seen from FIG. 1, the location of the center line of the pin 53 is the same distance on one side of the point midway the ends of the brake beam 7 as is the location of the longitudinal center line of the brake cylinder device 12 carried by the brake beam 7 on the other side of this point midway the ends of this brake beam 7. Accordingly, it is apparent that the brake beam 7 is acted upon by two equal forces acting in the same direction on opposite sides of the point midway the ends of this beam 7 at equal distances from this point. Therefore, it will be understood that these two equal forces acting on the brake beam 7 will move it in the direction of the right hand, as viewed in FIG. 1 of the drawings, until the brake shoes 16 carried by this beam are brought into braking contact with the tread surface of the wheels 1 and 2 carried adjacent the opposite ends of the axle 5 which prevents further movement of the brake beam 7 in the direction of the right hand.

Since the brake cylinder device 12 carried by the brake beam 6 and the brake cylinder device 12 carried by the brake beam 7 are identical, it will be apparent from the foregoing that each of the six brake shoes 16 will now be pressed against the tread surface of its corresponding wheel with the same force. Consequently, the fluid under pressure now being simultaneously supplied to the chamber in the brake cylinder device 12 carried by the brake beam 6 and in the brake cylinder device 12 carried by the brake beam 7 produces substantially equalized forces of application of all the brake shoes on the wheels of the car truck.

When it is desired to release the brake application, the fluid under pressure previously supplied to the chamber in each of the two brake cylinder devices 12 is vented in the usual manner through operation of the brake control valve device of the car brake system under the control of the operator, whereupon the force of a release spring (not shown) interposed between the piston and non-pressure head of each of the two brake cylinder devices 12, moves the piston and the body 18 of each of the two brake cylinder devices 12 in a brake releasing direction to move the brake beams 6 and 8 toward each other and the brake beam 7 in the same direction as the brake beam 8, and the brake shoes 16 carried by these brake beams away from the tread surface of the corresponding wheels to effect a brake release.

Due to the inclination of the grooves in the wear plate and guide members 15, the brake beams 6, 7 and 8 tend to return by action of gravity to their normal symmetrical relation with respect to the transoms 45 and 54 of the truck bolster 9, in which position the clearance between the brake shoes on one brake beam and their associated wheels is substantially equal to the clearance between the brake shoes on any other brake beam and their associated wheels. However, due to the predominating weight of the brake beams 6 and 7 each of which carry a brake cylinder device 12 over the weight of the brake beam 8 which carries no brake cylinder device, the tendency is for the brake beams 6 and 7 to travel by action of gravity, upon the release of fluid under pressure from the chambers within each of the brake cylinder devices 12, further down the inclined groove of the wear plate and guide members and thus past the normal intended release position. Therefore, in order to limit the travel of the two heavier brake beams towards their release position, each wear plate and guide member has the groove therein closed at its lower end. This closed end of the groove consequently serves as a limit stop to movement of the guide feet 14 toward a corresponding transom of the bolster 9.

Having now described the invention, what we claim as new and desire to secure by Letters Patent is:

1. A brake rigging for a six-wheel three-axle type of railway vehicle truck supported in a truck frame having a transverse axis and a longitudinal axis perpendicular thereto, which brake rigging comprises the combination of:
 (a) three brake beams extending in spaced substantially parallel relation to the transverse axis of the vehicle truck, one for each wheel pair and each guidably supported at the ends thereof on the truck for bodily movement longitudinally of the truck,
 (b) a brake cylinder casing secured to each of the two outer brake beams,
 (c) a first fulcrum bracket member secured to the intermediate one of said three spaced substantially parallel brake beams,
 (d) a first lever pivotally mounted midway its ends on said first fulcrum bracket member,
 (e) a first piston operable in one of said brake cylinder casings and cooperating therewith to form a first pressure chamber to which fluid under pressure may be supplied to respectively exert forces acting in opposite directions on said first piston and on said one casing, said first piston having a piston rod movable therewith substantially longitudinally of the truck and being operably connected to one end of said first lever,
 (f) a first link pivotally connected at one end to the other end of said first lever and at its other end to that one of said two outer brake beams carrying said one brake cylinder casing,
 (g) a second fulcrum bracket member secured to the truck frame,
 (h) a second lever pivotally mounted midway its ends on said second fulcrum bracket member,
 (i) a second piston operable in the other of said brake cylinder casings and cooperating therewith to form a second pressure chamber to which fluid under pressure may be supplied to respectively exert forces acting in opposite directions on said second piston and on said other casing, said second piston having a piston rod movable therewith substantially longitudinally of the truck and being operably connected to one end of said second lever.

(j) a second link pivotally connected at one end to the other end of said second lever and at the other end to that one of said two outer brake beams carrying said other brake cylinder casing, and (k) conduit means via which fluid under pressure may be supplied simultaneously to said first and second pressure chambers and simultaneously released therefrom for effecting movement of said three brake beams to cause concurrent application and release of braking force to and from the six wheels of the railway vehicle truck.

2. A brake rigging for a six-wheel three-axle type of railway vehicle truck, as claimed in claim 1, further characterized in that:

(a) said first fulcrum bracket member is carried on said intermediate brake beam substantially midway the ends thereof, (b) said second fulcrum bracket member is carried by the truck frame in coaxial alinement with said first fulcrum bracket member, and in that (c) the brake cylinder casing secured to one of the two outer brake beams is the same distance from the longitudinal axis of the truck as is the brake cylinder casing secured to the other of the two outer brake beams but on the opposite side of said axis.

3. A brake rigging for a six-wheel three-axle type of railway vehicle truck, as claimed in claim 1, further characterized in that the brake cylinder casings secured to the two outer brake beams are of the same size to provide for the application of substantially equal braking forces to each of the six wheels of the railway vehicle truck.

4. A brake rigging for a six-wheel three-axle type of railway vehicle truck, as claimed in claim 1, further characterized in that the two outer brake beams are identical, and each has a mounting flange at one side of a point midway the ends thereof for receiving a brake cylinder casing, and in that said intermediate brake beam has attached thereto, midway the ends thereof and coincident with the longitudinal axis of the truck, said first fulcrum bracket member.

5. A brake rigging for a six-wheel three-axle type of railway vehicle truck, as claimed in claim 1, further characterized in that the brake cylinder casing secured to each one of the two outer brake beams is disposed on that side of the respective brake beam that is adjacent the corresponding axle.

6. A brake rigging for a railway vehicle truck having multiple wheel and axle pairs supported therein and both a transverse axis and a longitudinal axis perpendicular to each other, which brake rigging comprises:

(a) a pair of brake beams extending in spaced substantially parallel relation to the transverse axis of the vehicle truck, and guidably supported at the ends thereof on the truck for bodily movement longitudinally of the truck, (b) a brake cylinder casing secured to one of said brake beams, (c) a fulcrum bracket member secured to the other of said brake beams, (d) a lever pivotally mounted midway its ends on said fulcrum bracket member, (e) a piston operable in the brake cylinder casing secured to said one of said brake beams and cooperating with said casing to form a pressure chamber to which fluid under pressure may be supplied to respectively exert forces acting in opposite directions on said piston and on said casing, said piston having a piston rod movable therewith substantially longitudinally of the truck and being operably connected to one end of said lever, and (f) a link pivotally connected at one end to the other end of said lever and at its other end to that one of said brake beams to which said brake cylinder casing is secured, (g) said link, lever and piston rod cooperating to transmit the fluid pressure force on said piston to said brake beam to which said casing is secured whereby said force, in cooperation with the fluid pressure force exerted on said casing, effects movement of said brake beam in one direction to a brake applying position with respect to a corresponding pair of wheels of the truck, and to transmit the fluid pressure force on said piston to said other one of said brake beams to effect movement thereof in a direction opposite said one direction to a brake applying position with respect to another pair of wheels of the truck.

7. A brake rigging, as claimed in claim 1, wherein auxiliary means supported by the truck frame beneath the said brake beams serves to support the brake beams upon failure of the normal supporting means therefor.

8. A brake rigging for a six-wheel three-axle type of railway vehicle truck, as claimed in claim 1, further characterized by a plurality of parallel spaced-apart safety supporting straps anchored to the truck frame, some of said supporting straps extending longitudinally beneath two adjacent brake beams of said three brake beams and some of said supporting straps extending longitudinally beneath the third one of said three brake beams, said straps serving to support one or more of said brake beams upon failure of said one or more of said brake beams to be guidably supported in normal fashion at the ends thereof on the truck.

9. A brake rigging for one wheel pair of a multiple wheel railway vehicle truck supported in a truck frame having a transverse axis and a longitudinal axis perpendicular thereto, which brake rigging comprises the combination of:

(a) a brake beam extending in spaced substantially parallel relation to the transverse axis of the vehicle truck and guidably supported at the ends thereof on the truck frame for bodily movement longitudinally of the truck, (b) a brake cylinder casing secured to said brake beam, (c) a truck bolster resiliently supported on the truck frame, said bolster having at least two transoms, (d) a longitudinally extending fulcrum bracket member having its opposite ends secured to said transoms respectively, and having an opening therein intermediate its ends, (e) a lever extending through said opening in said fulcrum bracket member and pivotally mounted midway its ends on said bracket member, (f) a piston operable in said brake cylinder casing and cooperating therewith to form a pressure chamber to which fluid under pressure may be supplied to exert forces acting in opposite directions respectively on said piston and on said casing, said piston having a piston rod movable therewith substantially longitudinally of the truck and being operably connected to one end of said lever, and (g) a link pivotally connected at one end to the other end of said lever and at its other end to said brake beam, (h) said link, lever and piston rod cooperating to transmit the fluid pressure force on said piston to said brake beam whereby said force in cooperation with the fluid pressure force exerted on said casing effects movement of said brake beam in a direction toward a brake applying position with respect to the one wheel pair of the truck.

10. A brake rigging for one wheel pair of a multiple wheel railway vehicle truck, as claimed in claim 9, further characterized in that:
  (a) said fulcrum bracket member comprises:
    (i) a body member having a rectangular opening therein through which said lever extends, said member having a pair of coaxial bores extending through a pair of opposite parallel walls of said opening for anchoring therein the opposite ends of a fulcrum pin upon which said lever is rockably mounted, and
    (ii) a pair of clevis arms extending longitudinally in opposite directions away from said body member by which said body member is mounted on said transoms of said truck bolster.

References Cited
UNITED STATES PATENTS 2,633,936    4/1953    Settles.
3,371,748    3/1968    Cunningham et al. ____ 188—47

DUANE A. REGER, *Primary Examiner.*

U.S. Cl. X.R.

188—153, 210